Patented July 30, 1946

2,404,836

UNITED STATES PATENT OFFICE 2,404,836

MODIFIED ALKYD TYPE RESINS

Howard L. Gerhart and Leon M. Adams, Milwaukee, Wis., assignors to Pittsburgh Plate Glass Company, a corporation of Pennsylvania No Drawing. Application January 15, 1943, Serial No. 472,476

7 Claims. (Cl. 260—42)

The present invention relates to artificial resins of relatively complex compositions and it has particular relation to resins including in their composition an intimate, stable blend or copolymer of a polyhydric alcohol—mono and dicarboxylic acid ester and a cyclic diene hydrocarbon.

One object of the invention is to provide a resin suitable for use as a coating film and for other purposes, which resin has high resistance to attack by alkalies and is also highly resistant to aging when it is subjected to exterior exposure.

Alkyd resins comprise one of the common types of synthetic plastics employed in the preparation of coating compositions and the like. These resins have high resistance to aging. They also possess other valuable properties, but are characterized by relatively low resistance to the action of alkalies. On the other hand, another type of resin obtained by polymerization of cyclopentadiene or its dimer dicyclopentadiene has high resistance to the action of alkalies and lower resistance to weathering and aging. The blending of these two types of resins to obtain a mixture having the advantages of both might suggest itself. Unfortunately, it is not possible to effect a union of the two types by mechanically mixing one with the other. The two types are not compatible and one or the other will "throw out" of the solution. No amount of heating will assist the solution of one in the other.

According to the provisions of the present invention, a method has been found by which cyclopentadiene, its polymeric forms, or copolymers of cyclopentadiene with other unsaturates can be combined with the alkyd type resins to obtain the advantages of both. The method consists in charging cyclopentadiene and an alkyd resin base into an autoclave and copolymerizing the charge at elevated temperatures and pressures. By alkyd resin base is meant the condensation product obtained by interesterifying a dibasic acid anhydride (such as phthalic or maleic anhydride, etc.) with a polyhydroxy compound (such as glycerol, ethylene glycol, etc.) and oil acids (such as linseed oil acids, soya oil acids, etc.) Likewise the term alkyd resin may refer to the product obtained by reacting a monoglyceride with a dibasic acid and glycerine by the methods well known to the synthetic resin industry. It is preferred to use this alkyd resin free from solvents or other volatile matter. It is generally preferred to have the esterification essentially complete and to use an alkyd type resin base in which the acid number is low.

The charge of cyclopentadiene (or its dimer) and the alkyd resin base is heated in the autoclave with agitation until the temperature approaches 180° C. The temperature is allowed to coast to about 220° C. and thereafter cautiously heated to 250-280° C. until the desired viscosity is obtained. At this point the batch is cooled or added to the proper quantity of thinner.

Many alkyd resins decompose at elevated temperatures releasing the dibasic acids which tend to clog the appurtenances to the autoclave. This also causes the product to turn dark. To minimize this, it is desirable to keep the reaction temperature as low as possible without unduly increasing the reaction time.

It is also desirable to add a glyceride oil to the cyclopentadiene-alkyd resin charge. This produces a more flexible resin with a lighter color.

The following examples illustrate the types of charges which have been found useful in the operation of this invention:

Example I

| | Pounds |
|---|---|
| Maleinized linseed oil | 144 |
| Dicyclopentadiene | 56 |

The maleinized oil was made by the glycerolysis of 2610 pounds alkali-refined linseed oil with 156 pounds glycerine at 450° F. using 0.75 pound litharge as the alcoholysis catalyst. This glyceride was esterified with 205 pounds maleic anhydride to an acid number of 8.

Example II

The product of Example I was removed when the body in solvent naphtha was G (Gardner-Holt scale). It dries rapidly but the viscosity increases with age so that it is not suitable for all types of use. A more stable product can be made by including linseed oil in the charge:

| | Pounds |
|---|---|
| Medium bodied linseed oil | 71 |
| Maleinized linseed oil of Example I | 71 |
| Dicyclopentadiene | 58 |

This copolymer has a longer shelf life and dries well. It has a much longer durability to exterior exposure than a copolymer containing no alkyd resin base.

Example III

An alkyd resin base of acid number 8 was prepared from cottonseed acids, the charge consisting of:

| | Pounds |
|---|---|
| Cottonseed acids | 924 |
| Phthalic anhydride | 320 |
| Glycerine | 250 |

A charge consisting of:

| | Pounds |
|---|---|
| Above alkyd resin base | 572 |
| Dicyclopentadiene | 228 | was treated in the autoclave as described. The product dries much faster than the original alkyd resin base.

Example IV 480 pounds alkyd base of Example III was copolymerized with 320 pounds dicyclopentadiene.

The product dries very well, and it has excellent alkali resistance.

Example V

An alkyd resin base was made from:

| | Pounds |
|---|---|
| Linseed acids | 2540 |
| Phthalic anhydride | 1865 |
| Glycerine | 1165 |

Of this base, 480 pounds was charged in an autoclave with 320 pounds dicyclopentadiene. The reaction was continued until the body was I (Gardner-Holt Scale), at 50% solids in aromatic spirits. It dries very rapidly without drier.

Example VI 200 pounds of the alkyd base in Example V was charged with 200 pounds dicyclopentadiene and 400 pounds medium bodied linseed oil. The reaction was stopped at E body in 50% in petroleum naphtha. This product dries less rapidly than the final product of Example V, but it is more flexible.

In the examples dicyclopentadiene can be replaced by cyclopentadiene. Indeed it is probable that dicyclopentadiene is decomposed under the conditions of reaction to form cyclopentadiene, which then reacts with other ingredients.

It is further understood that cyclopentadiene or dicyclopentadiene may be replaced at least in part by other diene hydrocarbons, such as butadiene methyl cyclopentadiene and isoprene. These latter may for example replace considerable percentages of the cyclopentadiene, e. g., 5 percent.

Maleic acid and alpha-beta unsaturated, alpha-beta dicarboxylic acids and phthalic acid anhydride may be replaced in whole or in part by molecularly equivalent amounts of other acids containing two or more carboxyl groups, examples of these are citraconic acid, aconitic acid, or anhydrides thereof, fumaric acid, mesaconic acid and the like.

The ratios of cyclopentadiene to alkyd resin are susceptible of variation over substantial range. The lower the proportion of cyclopentadiene, the closer the product will resemble the alkyd base.

What we claim is:

1. A new resin product consisting of the copolymer of (A) compound of the class consisting of cyclopentadiene and dicyclopentadiene and (B) an alkyd resin consisting of the unsaturated glyceride oil acid modified polyester of a polyhydric alcohol and a dicarboxylic acid said product being soluble in petroleum naphtha.

2. A new resin product consisting of a copolymer of dicyclopentadiene and an alkyd resin consisting of the polyester of phthalic acid, glycerol and the free fatty acids of a drying oil, said product being soluble in petroleum naphtha and having high resistance to weathering and to alkalies.

3. A resin product as defined in claim 1 in which the dicarboxylic acid component is $\alpha\beta$ unsaturated $\alpha\beta$ dicarboxylic.

4. A new resin consisting of the copolymer of (A) cyclopentadiene and (B) an alkyd resin consisting of the polyester of glycerol, maleic acid and free unsaturated acids from linseed oil.

5. A process of preparing a resin having high resistance to weathering and to the action of alkalies, which process comprises copolymerizing a mixture consisting of cyclopentadiene and an alkyd resin obtained by esterifying a mixture consisting of glycerol, an unsaturated fatty acid of a drying oil and maleic anhydride by heating said mixture in a closed container to a temperature approximately within a range of 180 to 280° C. until a resin soluble in petroleum naphtha is formed.

6. A process of treating an alkyd resin obtained by esterification of a mixture consisting of glycerol, a dicarboxylic acid anhydride, and a free unsaturated fatty acid of a drying oil, which process comprises copolymerizing a mixture consisting of said resin and a cyclic diene hydrocarbon of the class consisting of cyclopentadiene and its dimer by heating the mixture in a closed container at a temperature of about 180 to 280° C. until a resin soluble in petroleum naphtha is formed.

7. A process of treating an alkyd resin obtained by esterification of a mixture consisting of glycerol, a compound of a class consisting of a dicarboxylic acid and the anhydride of said acid and a free unsaturated fatty acid of a drying oil, which process comprises copolymerizing a mixture consisting of said resin and a cyclic diene hydrocarbon consisting of cyclopentadiene and its dimer by heating the mixture in a closed container at a temperature of about 180 to 280° C. until a resin soluble in petroleum naphtha is formed.

HOWARD L. GERHART.
LEON M. ADAMS.